March 28, 1961 N. L. CHALFIN 2,977,126

PHONOGRAPH PICKUP ARM

Filed March 26, 1956 2 Sheets-Sheet 1

Norman L. Chalfin

INVENTOR.

March 28, 1961 N. L. CHALFIN 2,977,126

PHONOGRAPH PICKUP ARM

Filed March 26, 1956 2 Sheets-Sheet 2

Norman L. Chalfin
INVENTOR

United States Patent Office 2,977,126

Patented Mar. 28, 1961

2,977,126

PHONOGRAPH PICKUP ARM

Norman Leonard Chalfin, Culver City, Calif.
(460 San Juan Place, Pasadena, Calif.)

Filed Mar. 26, 1956, Ser. No. 573,786

4 Claims. (Cl. 274—23)

This invention relates to reproducing arms for sound-on-disc recordings and, more particularly, to an arm mechanism for maintaining a reproducing transducer coupled to the arm mechanism perpendicular to a radius of the record at all record diameters.

For the best possible reproduction of phonograph recordings the motion of the reproducing stylus of a phonograph record transducer should exactly reproduce the motion followed by the recording stylus which originally cut the laterally modulated groove. The following quotation from the article "Phonograph-Needle Drag Distortion," appearing on page 43 of National Bureau of Standards, Technical News Bulletin, vol. 37, number 3, March 1953, very clearly expresses this requirement: "For ideal distortion-free reproduction of recorded music or information, the motion of the tip of the playback needle, or stylus, should duplicate exactly the original lateral motion of the recording stylus. Provided the electrical output of the reproducing pickup is proportional to the lateral displacement of the reproducing stylus, the electrical output of the pickup will hen be undistorted. But if forces acting on the stylus cause longitudinal motion, its lateral motion will no longer duplicate exactly the motion of the recording stylus, which means that distortion will be introduced."

Failure of the playback device to meet the requirement set up in the quoted paragraph is known as tracking error. The presence of tracking error leads to distortion of the reproduced intelligence.

The pickup heads now used for laterally modulated disc recordings are offset with respect to the longitudinal axis of the reproducer arm on which they are supported, so that the axis of the pickup head forms some predetermined angle with respect to the axis of the arm. The purpose of the offset is to minimize the error in tracking and the consequent distortion in reproduction of music or information stemming from the tracking error.

It is well known that despite the practice of offsetting the reproducer cartridge with respect to the axis of its arm pivoted at the other ends, distortion is still present. The distortion arises from the fact that the offset of the arm merely divides the tracking error so that a part of the error occurs at the outer diameters and a part nearer the center of the disc, while for a very small range of diameters in between there may be (if the angle is just right) a very small error or no error.

Because a reproducer arm normally is pivotally mounted at one end, the pickup head, or reproducer cartridge mounted on the arm describes an arc, therefore, the lateral stylus movement will not be tangent to the disc diameter on this arc at all points of the arc and will only match the original movement of the recording stylus at one point on the arc, namely, the point on the arc where the longitudinal axis of the reproducer cartridge is perpendicular to a record radius. At all other points in the arc traversed by the pickup the lateral motion of the stylus is at some angle other than along a radius of the disc.

The present invention overcomes the problem of tracking error that has been known for some time to exist in modern sound-on-disc record reproducing arm assemblies.

In this invention an old mechanical principle is applied to the reproducing arm assembly to provide a motion for the arm which maintains the position of the reproducing head on the record in such a relationship that the lateral movement of the reproducing stylus in the record groove matches the original movement of the recording stylus at all diameters of the record disc.

The principle employed as part of the invention is known as the Peaucellier cell. This is a mechanical linkage with which it is possible to impart a straight line motion to a point at one end of the linkwork which is pivoted at its other end.

Accordingly, therefore, it is an object of this invention to provide a phonograph record reproducing arm mechanism which maintains the axis of the reproducing head perpendicular to a radius of the recorded disc at all diameters of the disc.

It is another object of this invention to modify the linkage known as the Peaucellier cell so that its straight line motion may be employed to drive a phonograph pickup head in a straight line to exactly reproduce in playback the motion of the recording head in the recording process.

It is still another object of this invention to provide a linkwork drive for a phonograph record player reproducer arm by which the motion of the stylus of a reproducing head in the arm may be moved along a radius of a phonograph record and the longitudinal axis of the head maintained perpendicular to the radius of the record at all points on the record disc.

It is a further object of this invention to provide means for driving a phonograph pickup head in a straight line across a phonograph record by means of an arm which is pivoted at one end and has the pickup head attached at the other end.

It is yet another object of this invention to provide a linkwork with a drive and belt correcting means pivotally mounted on one end of the linkwork whereby the other end moves in a straight line and a means attached to this other end is always perpendicular to the straight line.

These and other objects of this invention will be further defined and may be better understood from the specification and claims which follow when taken together with the acompanying drawings in which;

When disc phonograph records are made, a stylus attached to and driven by a recording head cuts an undulating spiral groove into the surface of the disc. The undulations correspond to the recorded information. At this original recording the disc is rotated and the recording head slowly describes a straight line corresponding to a radius of the disc.

Figures 1, 2, 3, 4, 5, 6:
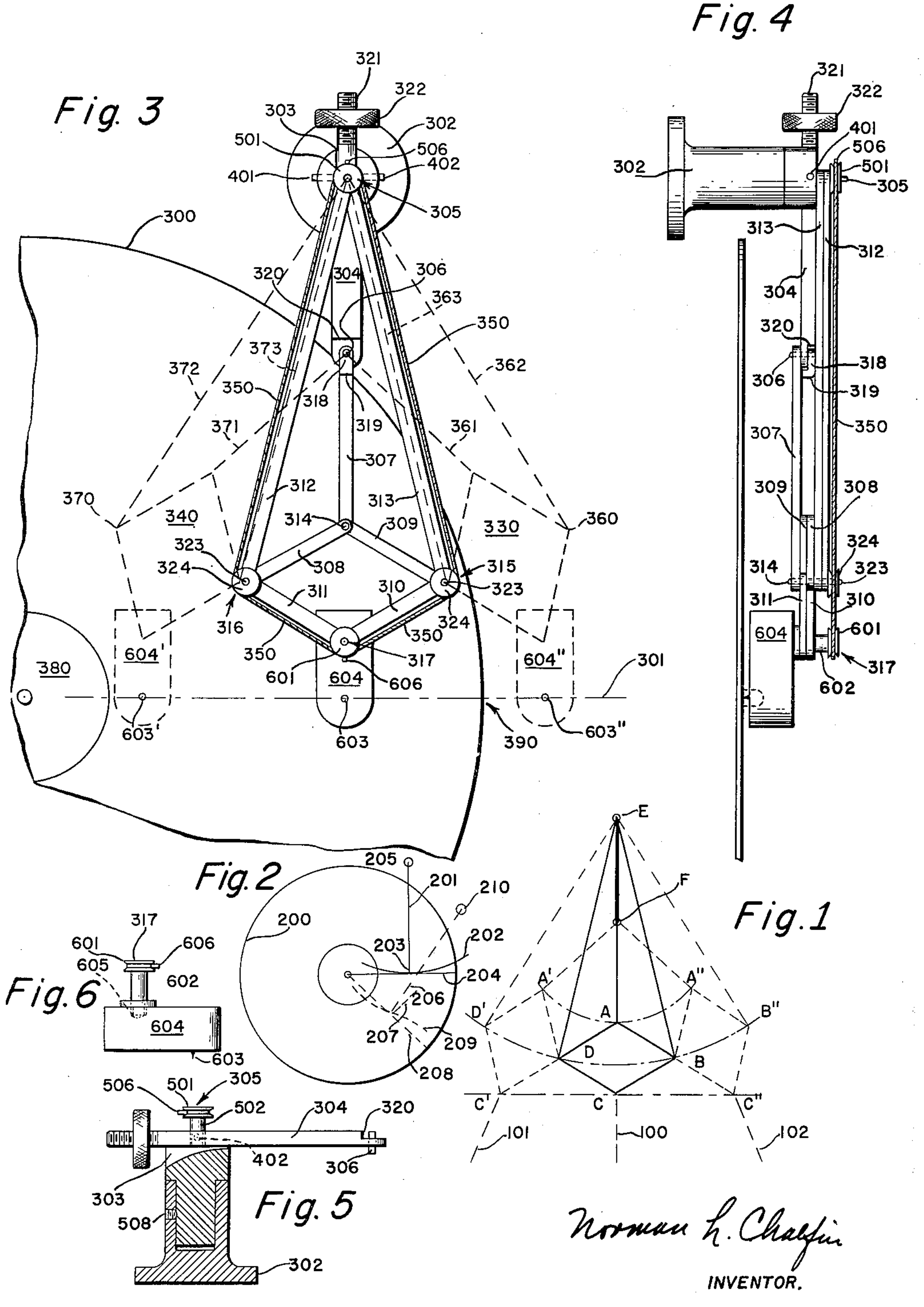
Fig. 1 is a theoretical schematic representation of the geometric principle forming a part of the invention.
Fig. 2 is a diagrammatic representation of the errors in tracking of a needle stylus which are overcome by this invention.
Fig. 3 is a plan view of a phonograph pickup arm mechanism and reproducer head assembly according to this invention.
Fig. 4 is a side elevational view of the invention shown in Fig. 3.
Fig. 5 is a side and partially cutaway view of a portion of the invention shown in Fig. 4.
Fig. 6 is a detail of the mounting of the reproducer head, a part of the assembly shown in Figs. 3 and 4.

Referring to Fig. 3 of the drawing wherein a part of the figure shows a disc 300, the line of travel of the recording stylus in the original recording process is, as described by line 301 going through the center of the disc and the stylus tip 603.

As previously mentioned, to accurately and perfectly reproduce the originally recorded information, it is desirable and necessary that the reproducing stylus be capable of traversing the record in exactly the same path as the original recording stylus which produced the undulation in the record.

In the early prior art a straight pickup arm was employed. A representation of the positioning of this arm can be seen in Fig. 2 where 200 represents a complete recorded disc. The line of the axis of the pickup arm is shown at 201. This is also the axis of the reproducing head. The playback stylus in the head normally moves at right angles to the axis of the head. The arc 202 is that followed by the stylus of arm 201 pivoting at 205 and the motion of the stylus at any point on arc 202 is tangent to arc 202 which can readily be seen to correspond to the original recording radius 204 only at point 203 where 204 and 202 join.

One approach to the reduction of tracking error, as this deviation of the motion of the playback stylus from the true recorded direction is called has been to offset the reproducing head on the arm so that the axis of the head makes an angle, usually about 15° with the axis of the arm as shown at 206 and 207 in Fig. 2. Whereas the stylus of the straight arm and head arrangement 201 follows an arcate path as at 202 the lateral stylus motion is tangent to the arc of this arcate path at any point on the path. The lateral stylus motion of an offset head when the head is properly positioned is tangent to a path which follows a shallow S-shaped curve as shown at 209 with respect to radius 208, and pivot point 210. This is due to the fact that the axis of the reproducing head to which the lateral stylus motion is perpendicular does not go through the pivot point of the phonograph arm but forms a line at an angle of 15° or so with respect to the arm axis from the stylus point to the right of the pivot point of the arm.

The tracking error of the straight arm is greater than the tracking error of the offset arm. These errors result in distortion of the reproduced information. In the past, the other devices such as amplifiers, loudspeakers and so forth in a reproducing system for phonograph records have been responsible for so much more distortion than the pickup tracking distortion that the latter was ignored. With the advent of high-fidelity amplifiers and other components it can no longer be disregarded.

Other approaches are found in U.S. Pat. No. 2,603,490, issued to D. J. Baker for a mechanism which purports to move an offset arm in such fashion as to overcome the error path I have shown in Fig. 2 at 209. To do this a cam is provided behind the dual pivot portion of the Baker device at a point roughly corresponding to 210 of my Fig. 2. The arm of the Baker invention roughly corresponding to arm 206 of my Fig. 2 is moved forward and back on its axis by the cam to correct the error as shown in my Fig. 2 between 209 and 208, as the arm pivots on 210. In effect the Baker invention in its operation moves the offset head to a different radius at each groove of the recorded spiral for any of the many positions of the arm with respect to the record.

I have devised an improved mechanism for the straight line movement of a phonograph reproducing head across the phonograph record so that the playback stylus at all positions on the record is in exactly the same position as the stylus which originally recorded the information on the disc. This invention is shown in Fig. 3 and is more fully described below. To accomplish the end result a straight line generating mechanism is used whose particular properties when modified according to my invention make it possible to provide a phonograph pickup arm articulating on a pivoting means at one end but describing a straight line at the other.

In Fig. 1, at the lower right of the drawing, there is shown a schematic representation of the straight line generating linkwork mechanism which forms the basis of my invention. The mechanism as represented in Fig. 1 comprises seven links. These include the rhombus of four equal bars ABCD joined at opposite corners with two equal bars BE and DE and a seventh link AF equal to half the length EA when the mechanism is at its central position as shown in the solid lines EDCB. The points E and F are fixed and stationary with respect to any mounting means to which the linkwork is attached. Point F is a pivot for link AF on which point A describes arc A'—A—A''. Point E is a pivot for link arms EB and ED joined at E on which points D and B describe arc D'—D—B—B''. Point C always moves in the exact straight line C'—C—C'' perpendicular to the line E—F.

This linkwork mechanism is attributed to C. N. Peaucellier, a French artillery engineer, and was originally applied to gun recoil mechanisms of large fortification artillery such as modern coastal guns. It appeared about 1864.

I have found in building up experimental models of the Peaucellier cell, by which the above described linkage is known, that although the point C describes a straight line, it rotates. Thus, when the mechanism is moved so that the linkwork takes the position E—D'—C'—D, shown in dashed lines, anything attached to C normally perpendicular to the line C'—C—C'', at 100, assumes the direction EC', as shown at 101. When the linkwork is moved to the other side of center, as shown in dashed lines E—B''—C''—B, attachment to point C assumes the direction EC'' as shown at 102.

From the discussion above, relating to the requirements of perfect and exact disc record reproduction, it can be seen that the rotation of point C in Fig. 1 as described above would disorient the axis of a playback head that may be attached to the point C. The distortion resulting therefrom would not provide the true reproduction which it is the aim of this invention to make possible.

I have used the Peaucellier cell principle successfully in this invention by placing captive pulleys at points corresponding to E and C of Fig. 1 and idler pulleys at points D and B. A belt is wrapped around the path E—D—C—B. The belt is fixed at a point on the pulley at E and at a point on the pulley at C, so that when the Peaucellier cell mechanism is in the position of axis E—C the two points of attachment of the belt are in line with axis E—C. The belt thus attached maintains the right angle relationship of the axis of a reproducing head connected to point C with respect to the line C'—C—C''.

Referring now to Figs. 3 and 4 in which a plan and a side elevational view respectively of a phonograph reproducing arm mechanism according to my invention is shown, there may be seen a support base 302 having a vertical slot 303 in its top surface. A support bar 304 is fixed in the vertical slot 303 of support 302 in such fashion that there can be no movement of bar 304 from side to side, but bar 304 may be moved easily, vertically, up and down, on pivots 401 and 402. The support bar 304 has two pivot means 305 and 306, respectively. Pivot means 305 is in the form of a pulley 501 and shaft 502 (see Fig. 5) which is fixedly attached to bar 304 and corresponds to the point E of Fig. 1. Pivot means 306 is provided in bar 304 for insertion of a pivot pin on which may be attached other parts of the linkage as further described below. Pivot means 306 corresponds to the point F of Fig. 1.

By virtue of the locking of bar 304 in slot 303 with respect to side to side motion, the pivot means 305 and 306 are fixed points remaining stationary and the same distance apart corresponding to fixed distance E—F of Fig. 1. At one end of pivot bar 304 which is beyond pivot means 305 and behind the base 302 a counterweight bar 321 and counterweight 322 are attached. A pair of link bars 312 and 313 are each, respectively, pivotally attached at one end to the shaft portion 502 of pivot means 305 and may articulate on the shaft 502 from side to side. Link bars 312 and 313 are held apart to form a V by rhombus links 308, 309, 310 and 311 which are joined with bars 312 and 313 in the following manner: One end of each of link bars 308 and 311 and the other end of bar 312 are joined at a pivot point 316, all three bars moving freely on the point 316. Link bars 309 and 310 are similarly joined with bar 313 at pivot point 315, and are similarly freely movably on pivot point 315. Pivot points 315 and 316 are each comprised of a shaft pin such as 323 and idler pulley such as 324.

Now, rhombus link bars 308 and 309 are pivotally joined together at their other end with one end of link bar 307. Link bar 307 is pivotally attached at its other end to pivot point 306. Link bar 307 is offset in such fashion as shown at 318 and 319 to provide parallel coupling of bar 307 with the other parts of the linkage, the offset at 318 and 319 forming a clevis joint with pivot point 306 of fixed bar 304. Link bar 307 is so dimensioned that the distance between its pivot point 314 and the point of attachment with pivot point 306 is equal to the distance between pivot point 305 and 306. The bar 307 corresponds to the link A—F of Fig. 1. Rhombus bars 311 and 310 are joined together at pivot point 317 and are pivotally attached to the shaft 602 of the pivot point assembly 317 which comprises pulley 601 and shaft 602 further described below. Thus the rhombus links 308, 309, 310 and 311 comprise a linkage corresponding to link bars DA, AB, BC and CD of Fig. 1 forming the rhombus ABCD.

Referring now to Fig. 6, it may be seen that pivot assembly 317 is attached to a phonograph pickup reproducing head 604. The attachment may be by threading the shaft into the head as shown at 605 or any other convenient means so that pickup head 604 may be attached to the linkwork as indicated at 317 in Figs. 3 and 4. A pin is shown at 606 in Fig. 6 attached to pulley 601. A similar pin is shown in Fig. 5 at 506 attached to pulley 501. The utility of these pins, 506 and 606 are further described below.

Referring now to Fig. 5 the arrangement of the base 302 with its upper portion including slot 303 is shown. The position of support bar 304 in slot 303 is shown along with the detailed arrangement of pivot assembly 305 including pulley 501 on its shaft 502 in support bar 304. A set screw 508 is provided in base 302 to permit raising or lowering the slotted portion of the base to accommodate the arm of this invention to phonograph record player turntables of different heights.

In Fig. 4 to which reference is now made, the vertical positioning relationships of the links of the rhombus 308, 309, 310, 311 may be seen with respect to the link bars 312, 313 and 307, their attachment to support bar 304 at the pivots 305 and 306. The attachment of reproducing head 604 to the link system is seen where and how shaft 602 provides the pivoting means at 317 for articulation of rhombus links 311 and 310; also clearly shown in Fig. 3 is pivoting means 306 by which link 307 is attached to support bar 304 with the clevis like arrangement of link 307 at 318 and 319.

Referring further to Fig. 4 and Fig. 3 a continuous belt 350 is run around pulleys 501, 324 on either side, 601 and back to 501. At pulley 501 belt 350 is pinned by pin 506 so as to fix the belt at that point. Similarly belt 350 is pinned to pulley 601 by pin 606 so that as the arm assembly is moved to the right of center, the portion of belt 350 on links 311 and 312 is tightened around pulley 501 and the portion of belt 350 on links 310 and 313 is loosened an equal amount away from pulley 501. This results in a strain on pulley 601 tending to rotate the head 604 to which pulley 604 is attached in a clockwise direction to overcome the tendency to rotate counter-clockwise which would be the case in the absence of the pulley. Head 604 thus assumes a position parallel with the center position at extreme right as shown at 604''.

Conversely, as the arm assembly is moved to left of center the portion of belt 350 on links 310 and 313 is tightened about pulley 501 while the portion of belt 350 on links 311 and 312 is loosened a like amount to apply a counter-clockwise twist to pulley 601 to overcome its clockwise rotating tendency and so maintain head 604 in its perpendicular relation to line 301 as shown at 604'.

The operation of this invention for the embodiment of Fig. 3 and Fig. 4 may clearly be seen from the foregoing description.

A phonograph pickup cartridge 604 is movably and rotatably attached to a Peaucellier cell linkage mechanism. Captive pulley 601 is fixedly attached to cartridge 604 and is movable with cartridge 604. A fixed captive pulley 501, at the base end of the Peaucellier cell linkage is arranged so that a cord or belt 350 fixed to pulleys 501 and 601 and disposed about the grooves thereof drives cartridge 604 so that it maintains a position perpendicular to the straight line generated by the movable point of attachment 317 to the Peaucellier linkage.

Thus, the pickup cartridge or head 604 when engaged with a record is moved across the record under the pressure of the groove spiral so that the stylus 603 at all times and at all diameters of the record is excited by lateral groove modulations in exactly the same relation as when the modulations were originally engraved on the record.

Figures 7, 8:
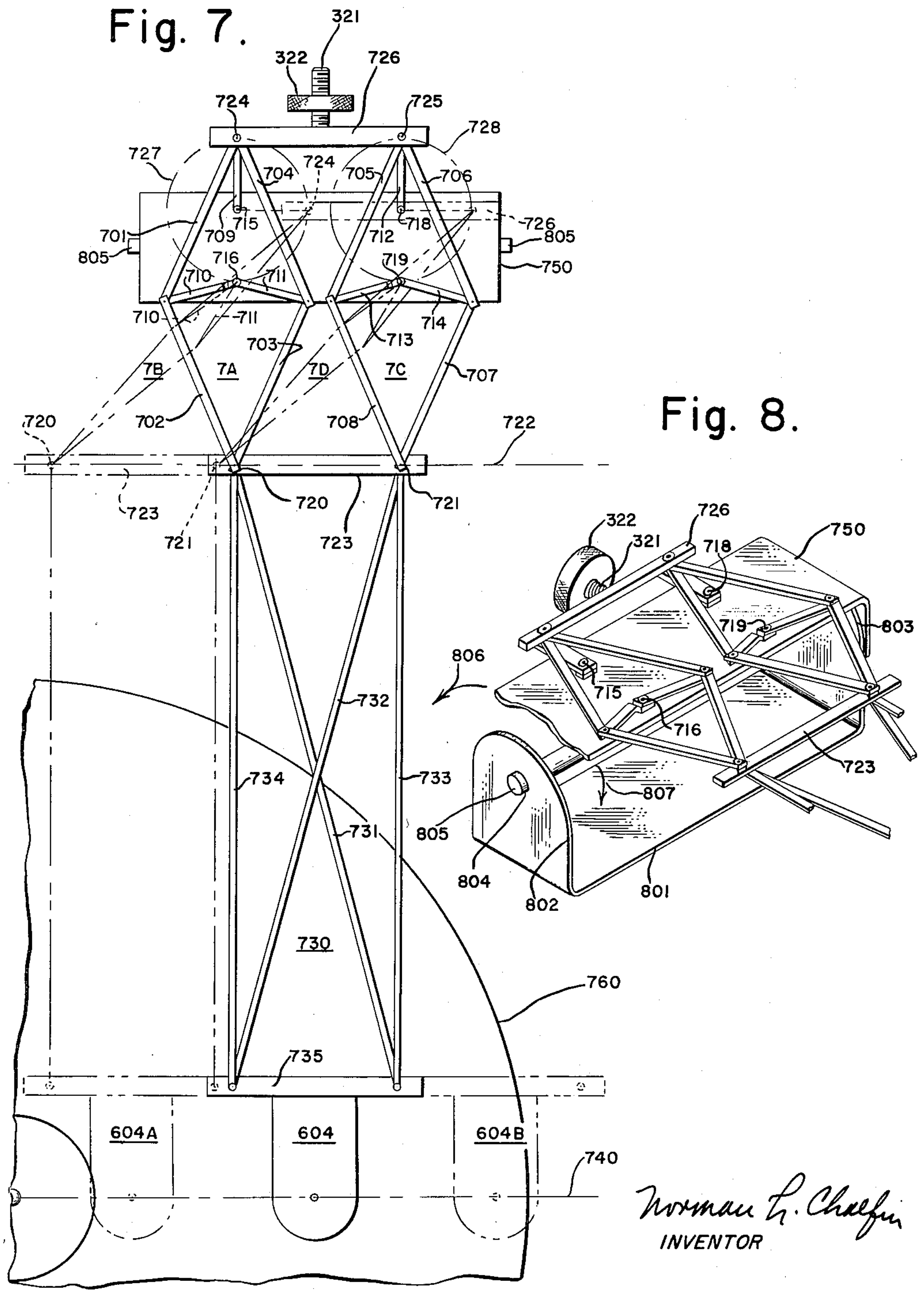
Fig. 7 is a plan view of another embodiment of this invention employing a variation of the principle of the invention.
Fig. 8 is a side elevational view of the embodiment of this invention shown in Fig. 7.

Another embodiment of the invention is illustrated in Figs. 7 and 8. In Fig. 7 a view looking down upon an arm in accordance with the invention is shown. Referring to Fig. 7 and also for reference, to Fig. 1 note that the Peaucillier linkages of Fig. 7 correspond in various respects to those of Fig. 1 as follows. A rhombus in Fig. 7, 701, 702, 703, 704 is similar to links AD—DC—CB—BA of Fig. 1 and links 308, 309 310, 311 of Fig. 3. In Fig. 7 there is a second rhombus, 705, 706, 707, 708 which is identical with the previously mentioned rhombus of Fig. 7. The two Peaucellier linkages of Fig. 7 are formed respectively with links 709 and 712 corresponding to link AF of Fig. 1 and link 307 of Fig. 3, but which in the Fig. 7 case are within the rhombus instead of outside the rhombus as in the Peaucellier linkage illustrations of Fig. 3 and Fig. 1. Links 710 and 711 and also 713 and 714 of Fig. 7, within the rhombuses otherwise correspond to links DE and BE of Fig. 1 and links 312 and 313 of Fig. 3. Within the rhombuses of Fig. 7 there are pairs of fixed pivot points 715, 716, and 718, 719, respectively, which apart from being within the rhombus otherwise correspond to points E and F of Fig. 1 and 305 and 306 of Fig. 3. The fixed pivot point pairs 715, 716, and 718, 719 are mounted in base 750 in fixed positions forming a rectangle.

It may be seen from the above that whereas in the Peaucellier cells of Figs. 1 and 3 the pivot points and the links connecting the pivot points to the rhombus are outside of the rhombus, in Fig. 7 the similar pivot points and links are within the rhombus.

The result in Fig. 7 is the same—that is, the points 720 and 721, generally corresponding to point C of Fig. 1 and point 317 of Fig. 3 each describes a straight line along 722. For simplicity of discussion, only the movement of rhombus 701, 702, 703, 704 is discussed. The rhombus 705, 706, 707, 708 moves identically and in parallel with rhombus 701, 702, 703, 704 by virtue of the link junctions 723 and 726 respectively.

Consider the rhombus point 720: as the rhombus of 7A is moved to the left it takes the position and shape of the rhombus in dashed lines 7B. 7C, accordingly, moves to a position as shown in dashed lines 7D. Point 724 of link 709 of rhombus 7A rotates about fixed pivot 715 on circle 727 to the dashed position 724. The links 710 and 711 pivot on fixed pivot point 716 at the same time. The position assumed by links 710 and 711 may be seen clearly on dashed rhombus 7B. It is perfectly clear that rhombus elements of 7C behave similarly in moving to position 7D.

Attached to link coupling bar 723 which moves in straight line 722 is a rectangular support member 730 which is supported by cross braces 731 and 732 and parallel bars 733 and 734. The bars 733 and 734 are perpendicular to coupling bar 723. A coupling bar 735, similar to 723, is attached at the opposite end of rectangular support member 730. A pickup cartridge 604 is attached at the center of a bar 735. Bar 735 is parallel to bar 723 and perpendicular to bars 733 and 734, joining the opposite ends of the rectangular support member 730.

When cartridge 604 of Fig. 7 is engaged in a phonograph record, by virtue of the previously described movement of parallel linkages 7A and 7B cartridge 604 is moved left to position 604A or right to 604B. The resulting action is again (as shown in the earlier described embodiment of Fig. 3) a straight line motion of cartridge 604 as at 740 with the axis of the cartridge always perpendicular to the straight line motion. In this embodiment the straight line-perpendicular motion is accomplished without resort to the cables or cords or belts such as shown in Fig. 3.

A counterbalance mechanism 321, 322 as previously described in connection with Fig. 3 is also employed in the mechanism of Fig. 7 and is attached to rear linkage coupling bar 726.

In Fig. 8 a partially cut-away view of the mounting mechanism for base 750 of the second embodiment can be seen. In order to provide vertical pivoting without lateral motion a U-shaped base 801 is provided with the upright portions 802, 803 of the U providing a bearing 804 for shaft 805. U-shaped base 801 may be fixedly attached to a phonograph motor board in appropriate location for record playing. Base 750, previously mentioned articulates on and is supported on shaft 805 as shown. The articulation arc is as shown by arrows 806 and 807. In this way the arm mechanism may be lifted off of a record readily for ease of changing records.

The arc of a record in relation to the arm mechanism of Fig. 7 is shown at 760.

There has been described a straight line generating phonograph pickup arm mechanism in two embodiments thereof, each employing an improvement of the basic linkage known as the Peaucellier cell.

In one embodiment a single cell is used and a means is shown for correcting an inherent condition of operation of the Peaucellier cell so that a phonograph pickup cartridge may be operated in the arm mechanism so that the cartridge always follows a straight line and the axis of the cartridge is always perpendicular to the straight line and so that the cartridge stylus always moves on the straight line and parallel to it. The straight line in this instance corresponds to a radius of a record, so that the mode of reproduction of the recorded information corresponds exactly to the method by which the information was originally recorded on the disc.

In a second embodiment, by the coupling together of two modifications of the Peaucellier cells, another method of achieving the straight line motion according to this invention is disclosed.

There may be other ways that may occur to those skilled in the art for utilizing the Peaucellier cell in phonograph pickup arms, now that I have disclosed how the cells may be employed in this application. Accordingly the embodiments shown are to be considered illustrative and other methods are possible within the ambit of my claims which follow.

I claim:

1. A phonograph pickup arm comprising the combination of a Peaucellier cell straight line motion generator having a pivot end and a moving end; a fixed mounting base adapted to receive said pivot end of said cell, said pivot end of said cell being pivotally mounted on said base, said moving end of said cell being constrained thereby to describe a straight line of motion as said cell is pivoted on said base; a phonograph record reproducing head pivotally attached to said moving end of said cell; and a driving mechanism including a first pulley fixedly attached to said phonograph record reproducing head, said first pulley being centered at the point of pivotal attachment of said head to said cell, a second pulley fixedly attached to said base, said second pulley being centered at a point of pivotal attachment of said cell to said base, and a continuous belt attached to a predetermined point respectively of each of said pulleys and coupled between them to maintain said head perpendicular to the straight line described by said moving end of said cell.

2. In a phonograph record reproducing arm the combination of a Peaucellier cell straight-line motion generator; a fixed base, said Peaucellier cell movably attached to said fixed base by one end of said cell; a phonograph record reproducing head movably attached to the other end of said cell linkwork; and a belt and pulley rotation correction mechanism having a ratio of unity between the pulleys thereof said mechanism coupled between a predetermined point of said fixed base and a predetermined point of said reproducing head through said cell and adapted to maintain the longitudinal axis of said reproducing head perpendicular to the straight line of motion generated by said cell.

3. A phonograph record playing arm assembly comprising in combination: a fixed base having a longitudinal slot in the top thereof, a support bar pivotally mounted in said longitudinal slot for vertical movement of said support bar, said support bar being limited to vertical motion only by said longitudinal slot, and having a first and a second pivot point at one end thereof, the other end of said support bar being extended a predetermined distance beyond said slot; a counter weight being slidably mounted on said extended portion of said bar; a Peaucellier cell being movably attached by one end thereof to said first and second pivot means thereby adapted to provide movement of the other end of said cell in a straight line perpendicular to the longitudinal axis of said support bar; a phonograph record reproducer head movably attached to said other end of said cell; a first pulley fixedly mounted on said support bar at said first pivot point; a second fixed pulley mounted on said record reproducer head at the point which is attached to said cell; and a driving belt fixedly attached to a predetermined point of said first pulley and to a predetermined point of said second pulley and adapted to compensate the motion of said head so as to maintain the longitudinal axis of said head parallel to said support bar at all positions of said other end of said Peaucellier cell to the limit of movement of said cell on said support bar, whereby when said arm assembly is operated in the grooves of a phonograph record, the reproducer head thereof tracks the grooves of the record in exactly the same relationship to the record surface as the original recording head which cut the grooves.

4. A phonograph record playing arm assembly comprising: a fixed base having a longitudinal slot in the top thereof and pivoting means entering said slot transversely from either side thereof; a support bar mounted on said pivoting means in said longitudinal slot for movement of said bar in a vertical plane on the transverse axis provided by said pivoting means, said bar having a first and a second pivot device, said first pivot device being centrally aligned on said bar with said transverse axis; said second pivot device being provided at one end of said bar a predetermined distance from said first pivot device, the other end of said support bar being extended a predetermined distance beyond said slot; a counter weight being slidably mounted on said extended portion of said bar; a Peaucellier cell having links at one end thereof and a rhombus at the other end thereof, said cell being movably attached by its links to said first and second pivot devices for providing movement of its rhombus end in a straight line perpendicular to the axis of said support bar; a phonograph record reproducer head movably attached to the rhombus end of said cell; a fixed first pulley coaxially positioned on said first pivot device; a second fixed pulley positioned on said reproducer head coaxially with said point of movable attachment thereof with said rhombus; and a drive belt coupled around the links and rhombus of said cell between said first fixed pulley and said second fixed pulley and adapted to control the motion of said head with respect to said rhombus so as to maintain the longitudinal axis of said head parallel to said support bar at all positions of said rhombus to the limit of movement of said Peaucellier cell on said support bar, whereby when said arm assembly is operated on a phonograph record, the reproducer head thereof tracks the grooves of the record in a perfect replica of the original recording process; and whereby the arm may be readily lifted vertically off of the record and placed thereon by the pivoting of said support bar on said transverse pivoting means.

References Cited in the file of this patent

UNITED STATES PATENTS

| | | |
|---|---|---|
| 408,970 | Haldeman | Aug. 13, 1889 |
| 759,566 | Stout | May 10, 1904 |
| 2,455,529 | Shortt | Dec. 7, 1948 |
| 2,516,565 | Guy | July 25, 1950 |
| 2,522,997 | Coppleman | Sept. 19, 1950 |
| 2,612,694 | Vaughan | Oct. 7, 1952 |
| 2,776,144 | Nichols | Jan. 1, 1957 |
| 2,837,339 | Rhodes | June 3, 1958 |

FOREIGN PATENTS

| | | |
|---|---|---|
| 4,155 | Great Britain | Dec. 18, 1873 |
| 386,851 | Great Britain | 1933 |
| 558,504 | Germany | Sept. 8, 1932 |

OTHER REFERENCES

Mechanism by Robert M. Keown, McGraw-Hill Book Co., 1921.